United States Patent
Kim

(10) Patent No.: US 9,502,041 B2
(45) Date of Patent: Nov. 22, 2016

(54) APPARATUS FOR DISPLAYING IMAGE AND DRIVING METHOD THEREOF, APPARATUS FOR OUTPUTTING AUDIO AND DRIVING METHOD THEREOF

(71) Applicant: Samsung Electronics Co., Ltd., Suwon-si (KR)

(72) Inventor: Je-ik Kim, Yongin-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 219 days.

(21) Appl. No.: 14/322,182

(22) Filed: Jul. 2, 2014

(65) Prior Publication Data

US 2015/0149184 A1 May 28, 2015

(30) Foreign Application Priority Data

Nov. 22, 2013 (KR) ........................ 10-2013-0143130

(51) Int. Cl.
| | | |
|---|---|---|
| *G10L 21/00* | (2013.01) | |
| *G10L 19/00* | (2013.01) | |
| *H04N 5/60* | (2006.01) | |
| *H04N 21/434* | (2011.01) | |
| *H04N 21/4363* | (2011.01) | |

(Continued)

(52) U.S. Cl.
CPC ............. *G10L 19/00* (2013.01); *H04N 5/60* (2013.01); *H04N 21/439* (2013.01); *H04N 21/4341* (2013.01); *H04N 21/43637* (2013.01); *H04N 21/8106* (2013.01)

(58) Field of Classification Search
USPC ................................ 704/270, 275, 500–504
See application file for complete search history.

(56) References Cited

U.S. PATENT DOCUMENTS

| | | | | |
|---|---|---|---|---|
| 5,684,714 | A * | 11/1997 | Yogeshwar | G11B 27/031 370/521 |
| 5,812,688 | A * | 9/1998 | Gibson | G10H 1/0008 381/119 |
| 6,351,733 | B1 * | 2/2002 | Saunders | H04S 3/00 434/308 |

(Continued)

FOREIGN PATENT DOCUMENTS

| | | |
|---|---|---|
| EP | 1770705 A1 | 4/2007 |
| EP | 1947843 A1 | 7/2008 |

(Continued)

OTHER PUBLICATIONS

Extended European Search Report dated Feb. 10, 2015 in corresponding European Patent Application No. 14189646.4.

*Primary Examiner* — Edgar Guerra-Erazo
(74) *Attorney, Agent, or Firm* — Staas & Halsey LLP

(57) ABSTRACT

An image display apparatus, a method for driving an image display apparatus, a sound output apparatus and a method for driving a sound output apparatus, are provided. The image display apparatus comprising a signal separator configured to separate an audio signal and a video signal from an input image signal, an audio decoder configured to decode the audio signal, a sound outputter configured to output the decoded audio signal, a sound effect generator configured to generate a sound effect at a user's request, a communication interface configured to transmit the separated audio signal and the generated sound effect to a surrounding sound output apparatus, respectively, and a controller configured to control the communication interface to transmit the audio signal and the sound effect to the sound output apparatus, wherein the separated audio signal is transmitted when the sound output apparatus is connected.

20 Claims, 6 Drawing Sheets

(51) Int. Cl.
*H04N 21/439* (2011.01)
*H04N 21/81* (2011.01)

(56) References Cited

U.S. PATENT DOCUMENTS

| | | | | |
|---|---|---|---|---|
| 8,274,611 B2* | 9/2012 | DeMartin | ................ | H04N 5/60 |
| | | | | 348/569 |
| 8,665,321 B2* | 3/2014 | Choi | ........................ | H04N 5/60 |
| | | | | 348/54 |
| 2003/0053680 A1* | 3/2003 | Lin | ........................ | H04S 5/005 |
| | | | | 382/154 |
| 2005/0149214 A1 | 7/2005 | Yoo et al. | | |
| 2009/0290064 A1* | 11/2009 | Matsumoto | ............... | H04S 3/00 |
| | | | | 348/515 |
| 2012/0002024 A1 | 1/2012 | Choi et al. | | |

FOREIGN PATENT DOCUMENTS

| | | |
|---|---|---|
| EP | 2555514 A1 | 2/2013 |
| JP | 2001-275089 | 10/2001 |

* cited by examiner

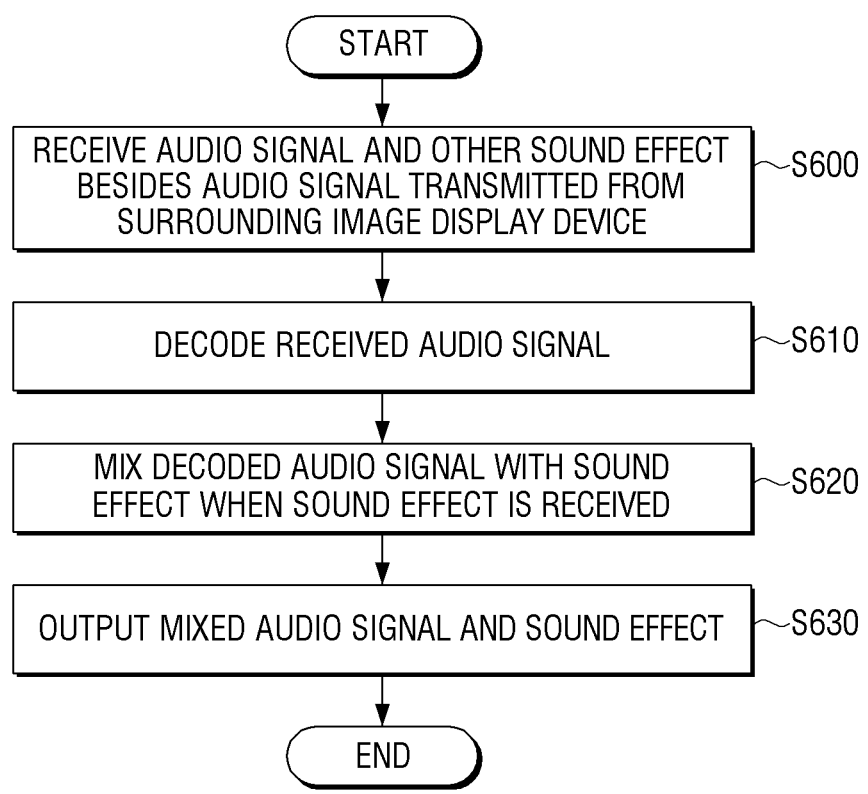

APPARATUS FOR DISPLAYING IMAGE AND DRIVING METHOD THEREOF, APPARATUS FOR OUTPUTTING AUDIO AND DRIVING METHOD THEREOF

CROSS-REFERENCE TO RELATED APPLICATIONS

This application is related to, and claims priority benefit of, Korean Patent Application No. 10-2013-0143130, filed in the Korean Intellectual Property Office on Nov. 22, 2013, the disclosure of which is incorporated herein by reference.

BACKGROUND

1. Field

Exemplary embodiments relate to an image display apparatus, a method for driving an image display apparatus, a sound output apparatus, and a method for driving a sound output apparatus, and more particularly to an image display apparatus that is capable of adding, to an audio, a sound effect requested by a user in, for example, a home theater system, and matching a lip sync of the video and audio, and a method for driving an image display apparatus, sound output apparatus, and method for driving a sound output apparatus.

2. Description of the Related Art

In general, a home theater system refers to a system in a home such that a user may view image signals of movies input in a VCR or a TV broadcasting signal form with the sensation as if the user is actually in a theater using a speaker of multi channels. Using this system, a user may experience the effect as if they are watching a movie in an actual theater. Thus, there are increasing number of households getting such home theater systems.

However, due to the tendency of products getting smaller in size and slimmer, it may be necessary to connect to an external speaker in order to properly listen to the audio, considering the characteristics of a TV. External speakers may be connected via wires such as optic cables etc., or the external speakers may be connected wirelessly.

When transmitting audio via optical cable, multi channel audio such as Dolby AC3 and HE-AAC may be compressed and transmitted. But a problem is that sound effects from TVs may not be properly generated. In other words, a need to transmit audio as quickly as possible and match the lip sync with the video is required, but when a sound effect is added, it may be difficult to match the audio and video.

That is, when a sound effect is added, a time delay may occur, making it difficult to match the lip sync of the audio and video. Thus, sound effects may not have been added and thus users could not hear the sound effects, which has been a problem.

SUMMARY

Additional aspects and/or advantages will be set forth in part in the description which follows and, in part, will be apparent from the description, or may be learned by practice of the invention.

An exemplary embodiment resolves the aforementioned problems, that is to provide an image display apparatus capable of adding, to audio, a sound effect requested by a user in, for example, a home theater system, and matching the lip sync, and a method for driving an image display apparatus, sound output apparatus and a method for driving a sound output apparatus thereof.

According to an exemplary embodiment, an image display apparatus is provided comprising a signal separator configured to separate an audio signal and video signal from an input image signal, an audio decoder configured to decode the audio signal, a sound outputter configured to output the decoded audio signal; a sound effect generator configured to generate sound effect at a user's request, a communication interface configured to transmit the separated audio signal and the generated sound effect to a surrounding sound output apparatus, respectively, and a controller configured to control the communication interface to transmit the audio signal and the sound effect to the sound output apparatus, wherein the separated audio signal is transmitted when the sound output apparatus is connected.

The separated audio signal may be transmitted in a compressed state to the sound output apparatus.

The image display apparatus may comprise a user interface configured to receive the user's request.

The audio signal and the sound effect may be transmitted to the sound output apparatus through short distance wireless communication.

The image display apparatus may comprise an audio decoder configured to decode the separated audio signal; an audio processor configured to post-process the decoded audio signal, and a sound outputter configured to output the post-processed audio signal.

The sound outputter may operate when the sound output apparatus does not operate.

The image display apparatus may comprise a mixer configured to mix sound effect generated in the sound effect generator with the post-processed audio signal, when the sound outputter is operating, and the sound outputter may output the mixed audio signal and the sound effect.

The image display apparatus may comprise a digital/analog (D/A) converter configured to convert the mixed audio signal and the sound effect having a digital format into a signal having an analog format, and the sound outputter may output the audio signal and the sound effect converted to have an analog format.

According to an exemplary embodiment, a sound output apparatus is provided comprising a communication interface configured to receive an audio signal and sound effect other than the audio signal from a surrounding image display apparatus, respectively, an audio decoder configured to decode the received audio signal, a mixer configured to mix the decoded audio signal and the sound effect, and a sound outputter configured to output the mixed audio signal and the sound effect, wherein the audio signal transmitted from the image display apparatus is received when the image display apparatus is connected.

The sound output apparatus may comprise an audio processor configured to convert the mixed audio signal and the sound effect into an audio format of the sound outputter.

The audio processor may comprise a D/A converter configured to convert the mixed audio signal and the sound effect having a digital format into a signal having an analog format.

The communication interface may receive the audio signal and the sound effect through short distance wireless communication with the image display apparatus.

According to an exemplary embodiment, a method for driving an image display apparatus is provided, the method comprising separating an audio signal and video signal from an input image signal; decoding the audio signal, outputting the decoded audio signal, generating sound effect at a user's request, transmitting the separated audio signal and the generated sound effect to a surrounding sound output apparatus, respectively, through a communication interface, and controlling the communication interface to transmit the audio signal and the sound effect to the sound output apparatus, wherein the separated audio signal is transmitted when the sound output apparatus is connected.

The separated audio signal may be transmitted in a compressed state to the sound output apparatus.

The method for driving an image display apparatus may comprise receiving the user's request.

The audio signal and the sound effect may be transmitted to the sound output apparatus through short distance communication.

The method for driving an image display apparatus may comprise decoding the separated audio signal, post-processing the decoded audio signal, and outputting the post-processed audio signal to a sound outputter.

The sound outputter may operate when the sound output apparatus does not operate.

The method for driving an image display apparatus may comprise mixing the provided sound effect with the post-processed audio signal, when the sound outputter is operating, and the outputting may comprise outputting the mixed audio signal and the sound effect to the sound outputter.

The method for driving an image display apparatus may comprise converting the mixed audio signal and the sound effect having a digital format into a signal having an analog format, and the outputting may comprise outputting the audio signal and the sound effect converted to have an analog format to the sound outputter.

According to an exemplary embodiment, a method for driving a sound output apparatus is provided, the apparatus comprising receiving an audio signal and sound effect other than the audio signal transmitted from a surrounding image display apparatus, respectively, decoding the received audio signal, mixing the decoded audio signal and the sound effect, and outputting the mixed audio signal and the sound effect in a sound outputter, wherein the audio signal transmitted from the image display apparatus is received when the image display apparatus is connected.

The method for driving a sound output apparatus may comprise converting the mixed audio signal and the sound effect into an audio format of the sound outputter, and the outputting may comprise outputting the audio signal and the sound effect having a format converted from the audio format.

The converting into an audio format of the sound outputter may involve converting the mixed audio signal and the sound effect having a digital format into a signal having an analog format.

The receiving may involve receiving the audio signal and the sound effect through short distance wireless communication with the image display apparatus.

BRIEF DESCRIPTION OF THE DRAWINGS

The above and/or other aspects of the present disclosure will be more apparent by describing certain present disclosure with reference to the accompanying drawings, in which:

FIG. 6 is a flowchart illustrating a process of driving a sound output apparatus according to an exemplary embodiment.

DETAILED DESCRIPTION

Figure 1:
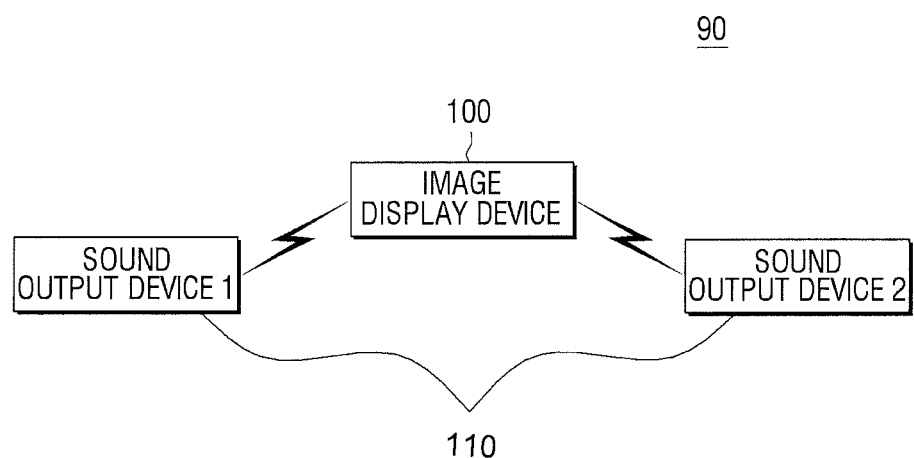
FIG. 1 is a view illustrating an audio output system according to an exemplary embodiment.

Reference will now be made in detail to the embodiments, examples of which are illustrated in the accompanying drawings, wherein like reference numerals refer to the like elements throughout. The embodiments are described below referring to the figures.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

FIG. 1 is a view illustrating an audio output system according to an exemplary embodiment.

As illustrated in FIG. 1, an audio output system 90 according to an exemplary embodiment comprises an image display apparatus 100 and at least one sound output apparatus 110.

An image display apparatus 100 according to an exemplary embodiment receives a broadcast image being input from outside and displays it on a screen, or receives an image being input from a user apparatus such as a VTR or a game device that the user connected and displays it on the screen. The image display apparatus 100 may be operated in an interlocked manner to an image relay apparatus such as a set-top box.

The image display apparatus 100 according to an exemplary embodiment may be a touch screen type image display apparatus of a touch screen type, a spontaneous emission display apparatus such as an OLED, or a light receiving display apparatus such as an LCD apparatus. The display apparatus may be such as a computer or mobile phone, instead of a TV. According to an embodiment, a light receiving display apparatus may be a display apparatus having a separate backlight unit that provides light. The backlight unit may comprise an LED, etc.

The image display apparatus 100 comprises, in itself, a sound outputter such as a speaker. However, in the case where a sound output apparatus 110 disposed adjacent to the image display apparatus 100 is connected via wires and/or wirelessly, the image display apparatus may block the audio being output to the sound outputter inside it and output the audio to the sound output apparatus 110. In this process, the image display apparatus 100 separates an audio signal from an input image signal, transmits the separated audio signal to the sound output apparatus 110 so that it may be decoded in the sound output apparatus 110. When a user's request is input, the image display apparatus 100 may read from, for example, a memory, the sound effect related to the user's request so that it may be added to the audio signal and transmit it to the sound output apparatus 110. The image display apparatus 100 transmits the separated audio signal and sound effect to the sound output apparatus 110 through short distance wireless communication method such as Bluetooth or Wi-Fi.

As a result, the sound output apparatus 110 is able to quickly process decoding of the audio signal to match the time spent in processing the video signal separated from the image signal and displaying it on screen, and thus it becomes possible to secure a sufficient margin to mix the sound effect according to the user's request to the decoded audio signal and output the result.

For example, if it took 80 m~100 ms for the image display apparatus 100 to decode the video signal and then output video data on screen, since the image display apparatus transmits the audio signal separated at the separating stage to the sound output apparatus 110, the sound output apparatus 110 has only to spend time for audio decoding. Therefore, even if additional time is spent for mixing the sound effect, it is sufficient to secure the margin for a lip sync with the video to be displayed on screen.

For example, after a mixing process, encoding may have had to be conducted on the mixed signal and then sent to the sound output apparatus 110 such as a home theater. Then the sound output apparatus 110 decoded the mixed signal and output it. On the other hand, an exemplary embodiment simplifies this process and provides a sufficient margin for a lip sync.

The sound output apparatus 110 receives the audio signal separated from the image signal from the image display apparatus 100, decodes the received audio signal, and outputs the decoded audio signal to the sound outputter such as a speaker. In this process, in the case where sound effect is transmitted from the image display apparatus at a user's request, the sound effect is mixed with the decoded audio signal and then output to the sound outputter. When it is necessary to postprocess (or scale) the decoded audio signal, the sound output apparatus 110 mixes the postprocessed audio signal and the sound effect and outputs the result to the sound outputter, and when it is necessary to convert the audio format of the sound outputter, for example, into an analog signal, the sound output apparatus 110 converts the mixed audio signal and sound effect into an analog signal and outputs the same to the sound outputter. Herein, postprocessing may be defined as equalizing or sound field processing for uniformalizing signals.

Figure 2:
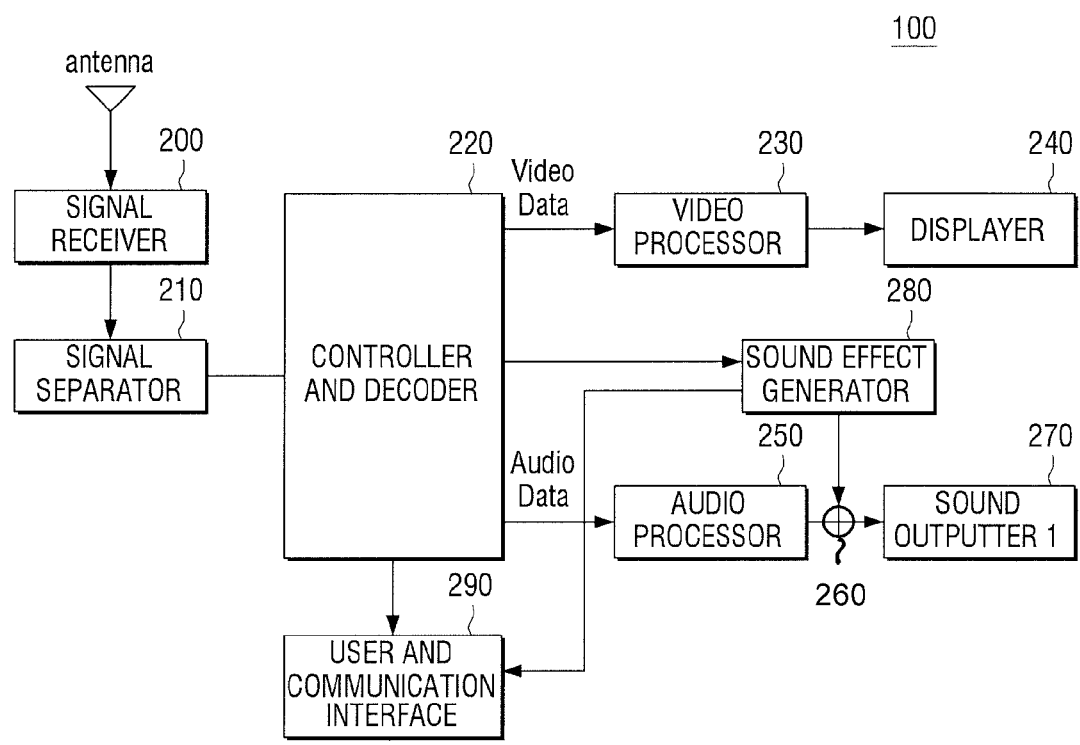
FIG. 2 is a block diagram illustrating an exemplary image display apparatus.

FIG. 2 is a block diagram illustrating an exemplary image display apparatus.

As illustrated in FIG. 1 and FIG. 2, an image display apparatus 100 according to an exemplary embodiment comprises some, or an entirety of, a signal receiver 200, signal separator 210, controller and decoder 220, video processor 230, displayer 240, audio processor 250, mixer 260, sound outputter 270, sound effect generator 280 and user and communication interface 290.

Herein, to comprise some or an entirety of elements may be defined as some of the elements such as the signal receiver 200, audio processor 250 and sound outputter 270 have been omitted or some of the elements such as the signal receiver 200 are integrated with other elements such as the signal separator 210.

The signal receiver 200 receives broadcast signals from a broadcasting station, and when connected to a VCR or camcorder, it may receive High Definition Multimedia Interface (HDMI) signals. When receiving a broadcast signal, the signal receiver 200 comprises a tuner for selecting a channel that a user wants, and a demodulator for demodulating a broadcasting signal of the channel selected in the tuner.

The signal separator 210 is a demux which separates an audio signal from an encoded that is, compressed image signal. The signal separator 210 separates the image signal into a video signal, audio signal and additional information. Additional information may be Program and System Information Protocol (PSIP) information that includes information on channels etc. For example, additional information may comprise channel organization information, biographic information of a particular program, or advertisement information in advertisements etc.

The controller and decoder 220 comprise a controller video decoder and audio decoder. The controller manages the additional information separated from the signal separator 210, and provides it to the video processor 230, for example, at a particular point, so that the video and additional information could be output from the displayer 240 together. The video decoder decodes the video signal provided from the signal separator 210, and then provides the decoded video signal to the video processor 230, and the audio decoder decodes the audio signal provided from the signal separator 210 and provides it to the audio processor 250.

The video processor 230 performs processing of the input video signal, that is video data, in accordance with the resolution of the displayer 240, for example, bit conversion etc. For example, the video processor 230 may convert the video data of high resolution that has been input into video data of low resolution. The video processor 230 may combine the scaled video data and additional information and output the result to the displayer 240.

The displayer 240 comprises a display panel. The displayer 240 displays the video data provided from the video processor 230 on a screen. In the process of displaying particular video data on the screen, when there is a request for additional information from the user, the displayer 240 displays the corresponding additional information together on the screen.

The audio processor 250 postprocesses the audio signal that has been decoded and provided, and outputs the postprocessed audio signal to the mixer 260. For example, the audio processor 250 may comprise an equalizer for postprocessing, for example uniformalizing the signal. Although not illustrated in FIG. 2, the audio processor 250 may be added between the mixer 260 and the sound outputter 1 270. Such an audio processor may comprise a D/A converter through which an audio signal of digital format or mixed audio signal and a mixing signal of the sound effect may be converted into signals of analog format. Therefore, the D/A converter can be regarded to change the image format.

The mixer 260 may operate when sound effect is provided at a user's request. When the sound effect is provided, the mixer 260 mixes the audio signal provided from the audio processor 250 to the sound effect and outputs the result to the sound outputter 1 270. A sound effect may be the sound generated, for example, when a button of a remote control is pressed. A sound effect may be generated, for example, when adjusting the stick in a gaming device.

The sound outputter 1 270 comprises a speaker. Such a speaker outputs the input audio signal as voice or sound that may be heard by users, and also outputs a sound effect that may be generated, for example, when a user presses a button of a remote control, etc.

In a case where there is a user's request through the user and communication interface 280, the user interface, the sound effect generator 280 may generate a sound effect under the control of the controller. For example, when the user pressed a particular button in a remote control, the controller may control so that the sound effect corresponding to the particular button can be provided from the sound effect generator 280. Therefore, the sound effect generator 280 may store a sound effect in a memory per each of various situations or matching each button in the remote control, and when there is a user's request, output a sound effect matching the corresponding request signal from the memory.

The user and communication interface 290 comprises a user interface and communication interface. The user interface receives the request signal generated when the user requests the image display apparatus 100 for a particular operation. The user interface may comprise a button for receiving a user's request from the user's direct contact. The communication interface may transmit the audio signal separated in the signal separator 210 to the sound output apparatus 110 and when there is a request for generating sound effect from the user, transmit the particular sound effect generated in the sound effect generator 280 to the sound output apparatus 110, under the control of the controller. Such a communication interface may operate when the sound output apparatus 110 is connected to the image display apparatus 100 via wire and/or wirelessly.

Figure 3:
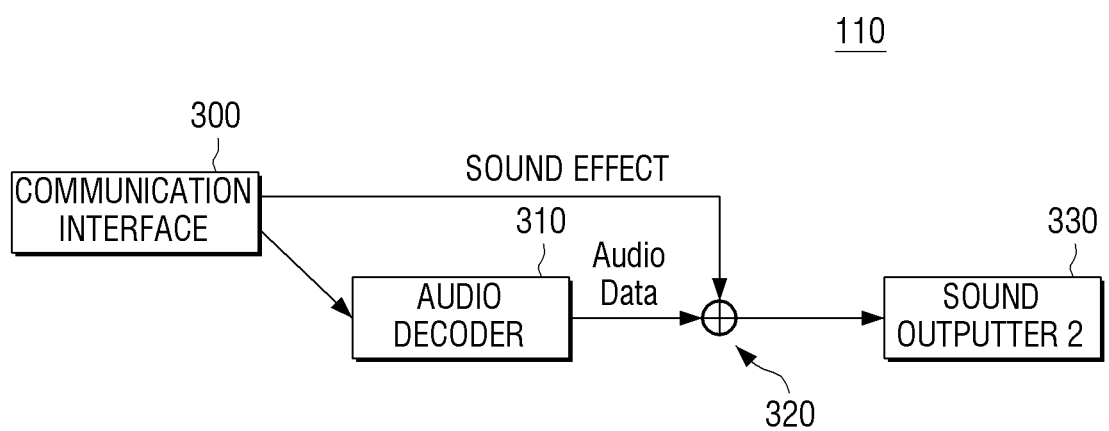
FIG. 3 is a block diagram illustrating an exemplary sound output apparatus.

FIG. 3 is a block diagram illustrating an exemplary sound output apparatus.

As illustrated in FIGS. 1-3, a sound output apparatus 110 according to an exemplary embodiment may comprise some, or an entirety of, a communication interface 300, audio decoder 310, mixer 320, and sound outputter 2 330, and may comprise some, or an entirety of, an audio processor (not illustrated), buffer (not illustrated), controller (not illustrated) and storage (not illustrated).

To comprise some or an entirety of elements may indicate that some of the elements such as the signal receiver 200, audio processor 250 and sound outputter 270 have been omitted or some of the elements such as the signal receiver 200 have been integrated with other elements such as the signal separator 210.

The communication interface 300 receives the audio signal transmitted from the image display apparatus 100 and provides it to the audio decoder 310. The communication interface 300 receives the sound effect from the image display apparatus 100 and provides it to the mixer 320. The communication interface 300 may comprise a determining unit for determining whether the received signal is an audio signal or sound effect.

The audio decoder 310 decodes the input audio signal and outputs the decoded audio signal to the mixer 320.

When a sound effect is provided through the communication interface 300, the mixer 320 mixes the sound effect to the audio signal and outputs the result to the sound outputter 2 330. In other words, in cases where an additional sound effect is not provided, the mixer 320 outputs the audio signal to the sound outputter 2 330 right away, but in cases where sound effect is provided while outputting the audio signal, the mixer 320 mixes the sound effect to the audio signal and outputs the result.

In this process, the sound output apparatus 100 may be provided with an audio processor, thereby converting the mixed audio signal and sound effect into an audio format of the sound outputter 2 330 and outputting the result. For example, the audio processor may comprise a D/A converter through which an audio signal and sound effect of digital format may be converted into an analog signal. The audio processor outputs the mixing signal that has been converted into an analog format signal to the sound outputter 2 330.

The sound output apparatus 110 may comprise at least one buffer for delaying the audio data in order to match the video data and lip sync output through the displayer 240 of FIG. 2. Such a buffer may be utilized for obtaining delay time by temporarily storing and outputting the audio data.

Since the sound output apparatus 100 may comprise a controller and storage, it may store input audio data in the storage, and when a certain period of time passes, it may output the audio data stored in the storage under the control of the controller, thereby matching the video data video data displayed on the displayer 240 and the lip sync.

Figure 4:
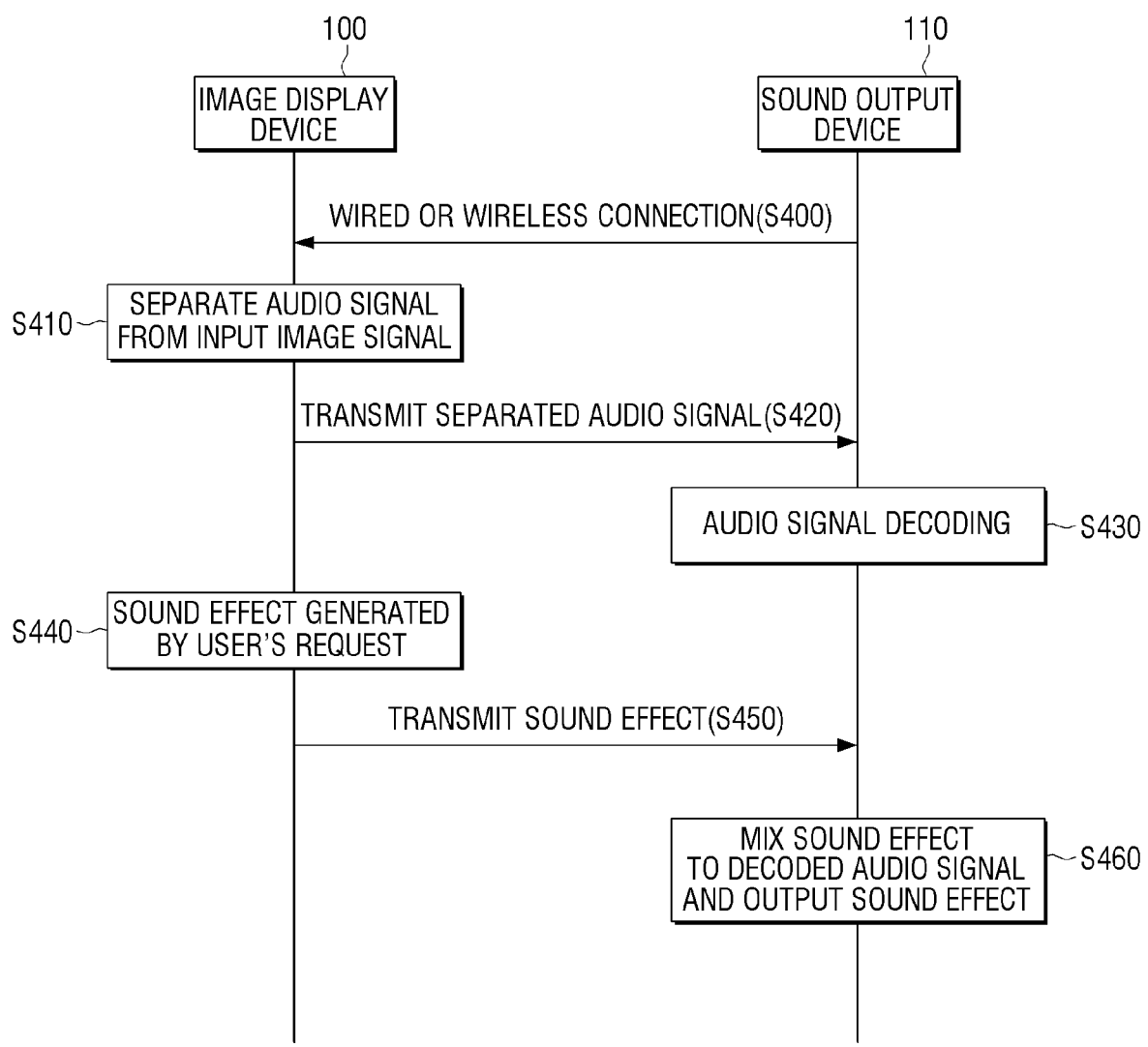
FIG. 4 is a view illustrating a process of outputting audio according to an exemplary embodiment.

FIG. 4 is a view illustrating a process of outputting audio according to an exemplary embodiment.

As illustrated in FIG. 4, the sound output apparatus 110 connects to the image display apparatus 100 via wire or wirelessly (S400). In a case of a wired connection, optic cables may be used, whereas in the case of wireless connection, short wireless communication such as Bluetooth and Wifi may be used. Thus, the image display apparatus 100 is capable of blocking the internal sound system and outputting audio to the sound output apparatus 110 nearby.

The image display apparatus 100 separates the audio signal from the input image signal (S410). The image display apparatus 100 separates the input image signal into a video signal, audio signal and additional information. The additional information, for example, comprises PSIP information, and may be information related to channels etc. For example, the additional information may comprise biographic information, advertisement information, and programming information etc. regarding the broadcasting of a particular channel.

The image display apparatus 100 transmits the separated audio signal to the sound output apparatus 110 (S420). Transmitting the audio signal may be made by short distance communication such as Wifi according to an exemplary embodiment.

The sound output apparatus 110 decodes the received audio signal (S430), and outputs the decoded audio signal through for example a speaker when there is no sound effect provided from the image display apparatus 100.

When there is a user's request for sound effect, the image display apparatus 100 generates sound effect (S440). Generating a sound effect may be, for example, providing a sound effect stored in a memory at a user's request, or generating a sound effect directly without prestoring.

The image display apparatus 100 transmits the generated sound effect to the sound output apparatus 110 (S450). According to an exemplary embodiment, the sound effect may be transmitted by a short distance wireless communication method.

When a sound effect is provided, the sound output apparatus 110 may mix the sound effect to the decoded audio signal and outputs the result outside (S460).

The sound output apparatus 110 may perform various operations such as equalizing the signal, converting the mixing signal of digital format into an analog format, or storing the mixing signal of digital format in the buffer etc.

The sound output apparatus 110 according to an exemplary embodiment is capable of obtaining a sufficient margin for processing an audio signal and sound effect, thereby matching the video data displayed on the image display apparatus and lip sync.

Figure 5:
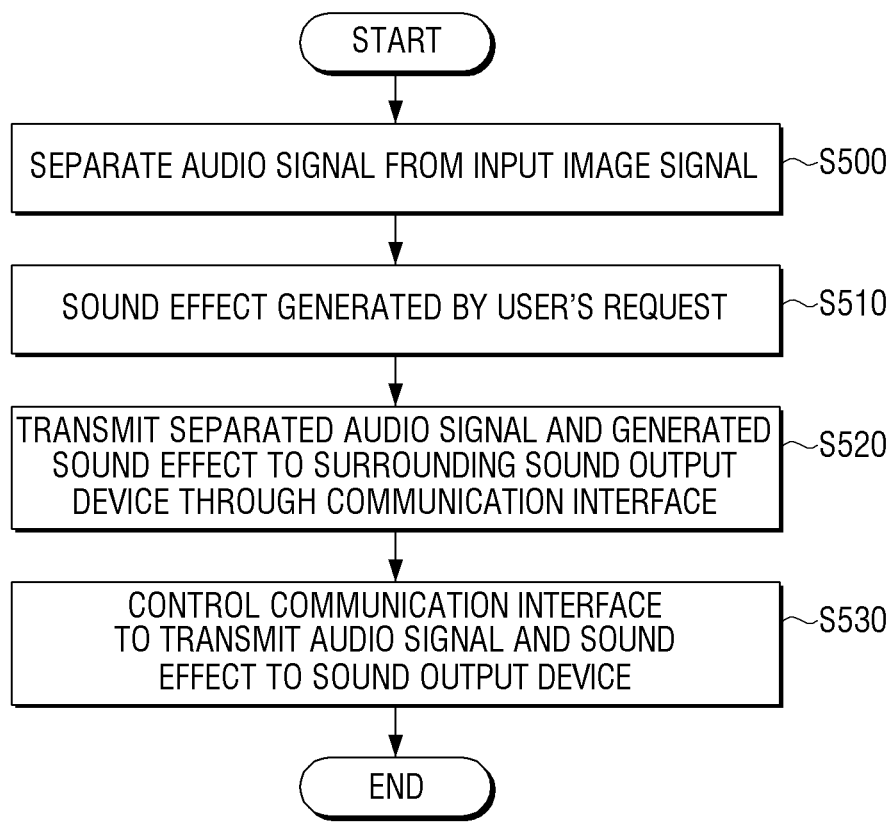
FIG. 5 is a flowchart illustrating a process of driving an image display apparatus according to an exemplary embodiment.

FIG. 5 is a flowchart illustrating an operating process of an image display apparatus according to an exemplary embodiment.

Referring to FIG. 1 and FIG. 2, the image display apparatus 100 according to an exemplary embodiment separates the audio signal from the input image signal (S500). The image display apparatus 100 separates image signal into a video signal, audio signal and additional information.

The image display apparatus 100 generates sound effect at a user's request (S510). The image display apparatus 100 may perform a process of determining whether there is a user's request. According to an embodiment a generating a sound effect may be an outputting the sound effect matching the user's request signal and stored in the memory.

The image display apparatus 100 transmits the separated audio signal and generated sound effect to a sound output apparatus 110 nearby through the communication interface (S520). Transmission may be, for example, by a short wireless communication method such as Wifi.

The image display apparatus 100 controls the communication interface for transmitting the audio signal and sound effect to the sound output apparatus 110 (S530). For example, the image display apparatus 100 controls the communication interface to transmit the audio signal to the sound output apparatus 110 prior to the sound effect, and controls the communication interface whenever sound effect is generated to transmit the sound effect to the sound output apparatus 110.

FIG. 6 is a flowchart illustrating a process of driving a sound output apparatus according to an exemplary embodiment.

With reference to FIG. 6 together with FIGS. 1 and 3, the sound output apparatus 110 according to an exemplary embodiment receives the audio signal transmitted from the image display apparatus 100 nearby and the sound effect other than the audio signal, respectively (S600). The audio signal may be received prior to the sound effect, and the sound effect may be received whenever there is a user's request.

The sound output apparatus 100 decodes the audio signal received (S610). The audio signal transmitted from the image display apparatus 100 is provided in a compressed state and is thus decoded at step S610.

When sound effect is received, the sound output apparatus 110 may output only decoded audio signal without an additional mixing process.

The sound output apparatus 110 outputs the mixed audio signal and sound effect outside (S630). The mixed audio signal and sound effect may be output outside through a sound outputter such as a speaker, and when sound effect is not provided, only an audio signal is output.

The sound output apparatus 100 may postprocess the decoded signal, convert the mixed audio signal from a digital format into an analog format, and may perform additional operations for delaying time using a buffer etc. in order to match the video data of the image display apparatus 100 and lip sync.

While elements of an exemplary embodiment may be combined and operate, an exemplary embodiment is not so limited. That is, it is within the scope of an exemplary embodiment, for at least some of the elements to be selectively combined and operate. Elements may each be realized as independent hardware. According to an exemplary embodiment, elements may be selectively combined. An element may be a computer program having a program module performing some, or an entirety, of the functions. Such a computer program may be stored in a non-transitory computer readable media, read and executed by a computer, and be embodied as an exemplary embodiment.

A non-transitory computer readable media generally refers not to a media that is capable of storing data for a short period of time such as a resistor, cache, and memory, but to a media that stores data semi-permanently and that may be read by a computer. An exemplary program may be stored and provided in a non-transitory computer readable media such as a CD, DVD, hard disc, blueray disc, USB, memory card, and ROM etc.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. An image display apparatus comprising:
a signal separator configured to separate an audio signal and a video signal from an input image signal;
an audio decoder configured to decode the audio signal;
a sound outputter configured to output the decoded audio signal;
a sound effect generator configured to generate a sound effect by a user's request;
a communication interface configured to communicate with a sound output apparatus; and
a controller configured to, when the sound output apparatus is connected to the communication interface, control the communication interface to transmit the separated audio signal and the generated sound effect to the sound output apparatus such that the separated audio signal is decoded and mixed with the generated sound effect in the sound output apparatus.

2. The apparatus according to claim 1,
wherein the separated audio signal is transmitted in a compressed state to the sound output apparatus.

3. The apparatus according to claim 1,
further comprising a user interface configured to receive the user's request.

4. The apparatus according to claim 1,
wherein the separated audio signal and the generated sound effect are transmitted to the sound output apparatus through short distance wireless communication.

5. The apparatus according to claim 1, further comprising:
an audio processor configured to post-process the decoded audio signal,
wherein the sound outputter configured to output the post-processed audio signal.

6. The apparatus according to claim 5,
wherein the sound outputter operates when the sound output apparatus does not operate.

7. The apparatus according to claim 6,
further comprising a mixer configured to mix the sound effect generated in the sound effect generator with the post-processed audio signal, when the sound outputter is operating,
wherein the sound outputter outputs the mixed audio signal and the sound effect.

8. The apparatus according to claim 7,
further comprising a digital/analog (D/A) converter configured to convert the mixed audio signal and the sound effect having a digital format into a signal having an analog format,
wherein the sound outputter outputs the audio signal and the sound effect converted to have an analog format.

9. A sound output apparatus comprising:
a communication interface configured to receive an audio signal that is separated from an image signal from an image display apparatus and a sound effect other than the audio signal generated in response to a user's request;
an audio decoder configured to decode the received audio signal;
a mixer configured to mix the decoded audio signal and the received sound effect generated in response to the user's request; and a sound outputter configured to output the mixed decoded audio signal and the generated sound effect, wherein the audio signal transmitted from the image display apparatus is received when the image display apparatus is connected to the sound output apparatus.

10. The apparatus according to claim 9, further comprising an audio processor configured to convert the mixed audio signal and the sound effect into an audio format of the sound outputter.

11. The apparatus according to claim 10, wherein the audio processor comprises a digital/analog (D/A) converter configured to convert the mixed audio signal and the sound effect having a digital format into a signal having an analog format.

12. The apparatus according to claim 9, wherein the communication interface receives the audio signal that is separated from the image signal and the sound effect other than the audio signal generated in response to the user's request through short distance wireless communication with the image display apparatus.

13. A method for driving an image display apparatus, the method comprising:

separating an audio signal and a video signal from an input image signal;

generating a sound effect by a user's request; and transmitting the separated audio signal and the generated sound effect to a sound output apparatus, respectively, through a communication interface such that the separated audio signal is decoded and mixed with the generated sound effect in the sound output apparatus, when the sound output apparatus is connected to the communication interface.

14. The method according to claim 13, wherein the separated audio signal is transmitted in a compressed state to the sound output apparatus.

15. The method according to claim 13, further comprising receiving the user's request.

16. The method according to claim 13, wherein the separated audio signal and the generated sound effect are transmitted to the sound output apparatus through short distance communication.

17. The method according to claim 13, further comprising:

decoding the separated audio signal;

post-processing the decoded audio signal; and outputting the post-processed audio signal to a sound outputter.

18. The method according to claim 17, wherein the sound outputter operates when the sound output apparatus does not operate.

19. The method according to claim 18, further comprising mixing the provided sound effect with the post-processed audio signal, when the sound outputter is operating, wherein the outputting comprises outputting the mixed audio signal and the sound effect to the sound outputter.

20. The method according to claim 19, further comprising converting the mixed audio signal and the sound effect having a digital format into a signal having an analog format, wherein the outputting comprises outputting the audio signal and the sound effect converted to have an analog format to the sound outputter.

* * * * *